(12) United States Patent
Garraffa

(10) Patent No.: US 7,712,793 B1
(45) Date of Patent: May 11, 2010

(54) SCUBA REGULATOR CONNECTOR USING SWIVEL BALL AND ONE-PIECE BUSHING

(76) Inventor: Dean R. Garraffa, 16742 Burke La., Huntington Beach, CA (US) 92647

( * ) Notice: Subject to any disclaimer, the term of this patent is extended or adjusted under 35 U.S.C. 154(b) by 0 days.

(21) Appl. No.: 12/315,665

(22) Filed: Dec. 5, 2008

(51) Int. Cl.
*F16L 27/04* (2006.01)
(52) U.S. Cl. .................................. 285/261; 285/148.15
(58) Field of Classification Search ............. 285/146.1, 285/148.13, 148.15, 148.16, 261, 263, 271, 285/114, 115, 116
See application file for complete search history.

(56) References Cited

U.S. PATENT DOCUMENTS

| | | | | |
|---|---|---|---|---|
| 1,883,279 A | * | 10/1932 | Zerk | 285/9.2 |
| 2,467,370 A | * | 4/1949 | Christensen | 285/98 |
| 2,564,938 A | * | 8/1951 | Warren | 285/95 |
| 2,680,358 A | * | 6/1954 | Zublin | 464/19 |
| 3,475,039 A | * | 10/1969 | Ortloff | 285/45 |
| 3,479,067 A | * | 11/1969 | Potts | 285/261 |
| 3,722,926 A | * | 3/1973 | Fukushima | 285/261 |
| 3,931,992 A | * | 1/1976 | Coel | 285/30 |
| 4,088,348 A | * | 5/1978 | Shemtov | 285/184 |
| 4,815,771 A | * | 3/1989 | Paspati | 285/263 |
| 5,127,681 A | * | 7/1992 | Thelen et al. | 285/121.7 |
| 5,149,146 A | * | 9/1992 | Simoni | 285/146.1 |
| 5,197,767 A | * | 3/1993 | Kimura et al. | 285/39 |
| 5,259,375 A | * | 11/1993 | Schuler | 128/205.24 |
| 6,846,022 B2 | * | 1/2005 | Takagi | 285/146.1 |
| 7,188,869 B2 | | 3/2007 | Garraffa | |
| 2005/0093295 A1 | * | 5/2005 | Byerly et al. | 285/261 |

* cited by examiner

*Primary Examiner*—Aaron M Dunwoody
(74) *Attorney, Agent, or Firm*—Leonard Tachner

(57) ABSTRACT

A ball and socket-type swivel connector for use with second stage scuba regulators used by scuba divers. The ball is made from a metal with good corrosion resistance. The ball is held in position by a low friction bushing. The bushing, compresses the metal swivel ball with light assembly pressure. This is accomplished by machining or molding the same radius of the swivel ball into one side of the low friction bushing. No seawater can enter the swivel. The ball has a unique O-ring slot or channel that completely encircles the ball along a path that permits an O-ring to wipe the bushing upon swiveling of the connector and prevents seawater from entering the swivel. No area exists for seawater to collect around the O-ring. The preferred embodiment uses a high-grade stainless steel swivel ball, low friction polymer bushing material and an internally lubricated low friction O-ring. A wiper ring boot, a ball and socket wiper that utilizes an outer boot as a wiper ring, keeps sand and contamination out of the rotational mechanism of the swivel.

4 Claims, 2 Drawing Sheets

SCUBA REGULATOR CONNECTOR USING SWIVEL BALL AND ONE-PIECE BUSHING

BACKGROUND OF THE INVENTION

1. Field of the Invention

The present invention relates generally to the field of scuba diving equipment and more particularly to a ball and socket swivel connector for second stage regulators.

2. Background Art

Scuba regulators utilizing ball swivels have been available for some time. The problem with current ball swivel designs is the O-ring sealing reliability and the effects of that reliability on product safety. In prior art designs the swivel ball is made from metal, "mostly chromed plated brass". This is a very cost-effective means to produce the ball. However, due to the effects of corrosion, the ball suffers from reliability problems. Current ball swivel designs allow seawater to leak into the O-ring sealing areas. When seawater is trapped inside the sealing area it will corrode the swivel ball. Once the swivel ball starts to corrode, the chromed surfaces degrade rapidly. The end result is the pressure sealing O-ring is often cut or abraded allowing system pressure to leak out. This is a safety concern. One could make the swivel ball from a material that will not corrode using various non-corrosive plating or machining the ball from expensive alloys such as titanium. These are effective solutions, but costly.

Another problem with the prior art design is it makes no provision to contain O-ring lubrication. Once the sealing O-ring becomes dry of lubrication, the metal swivel ball will tend to bind or require greater effort to rotate due to friction. In addition, the prior art design allows saltwater and fine sand to enter the system. This can scratch the metal ball and over time will degrade the O-ring. A better swivel ball sealing design is needed.

Applicant herein has addressed these problems with the swivel connector disclosed in U.S. Pat. No. 7,188,869. In the low-pressure ball swivel design of the '869 patent, the ball is made from a metal with good corrosion resistance. The ball is then held into a true position by two separate low friction bushings. The two bushings, "sandwich" the metal swivel ball with light assembly pressure. This is accomplished by machining or molding the same radius of the swivel ball into one side of each of the two low friction bushings. Thus the ball is held in position with extreme precision. The bushing could be machined or molded from many low friction plastics or internal lubricated materials.

Because the '869 patent discloses a stainless steel or titanium ball that rotates axially in a 30 degree range of motion, a pressurized condition, creates higher coefficient of friction between the metal swivel ball and O-ring. Also, when the O-ring is "sandwiched" or squeezed between two low friction bushings under light assembly pressure, even more friction is added to the metal ball and O-ring contact. Further, the overall design has manufacturing difficulty and would have better durability if the O-ring could be located in such a way as to expel debris before it could become impacted into the seawater side of the assembly.

SUMMARY OF THE INVENTION

The present invention comprises metal swivel ball and socket connected to a second stage regulator, with an integrated O-ring device having a low friction one-piece bushing surface and that is designed for significant ease of manufacture and a high degree of precision. Because the O-ring is located in the apex or tangent center, the swivel ball rotates within the cavity of a low friction radius of the bushing. The O-ring placement works to eliminate debris from collecting on the seawater side of the bushing aided with support of a lubricant filled cavity, sealed from seawater by means of a co-molded protective outer boot that rotates about the same axis.

The invention herein constitutes an improvement over the Applicant's '869 patent for the following reasons:

1) A low fiction polymer surface for the O-ring contact area improves the design with regard to ease of movement between metal ball and rubber O-ring.

2) A one-piece bushing design improves ease of manufacturing and precision movements.

3) An O-ring design rotates axially and self cleans the bushing and thus prevents debris from damaging the seawater side of the bushing assembly.

4) An outer designed boot seal with co-molded contact points improves prevention of contamination from entering the joint area.

5) The outer boot is designed to contain a small amount of silicone or Teflon grease to aid the O-ring with proper lubricant and serves as a barrier to water, sand and debris.

In the '869 patented invention, rubbing surfaces between materials such as a titanium or stainless steel "Ball" and rubber, such as the "O-ring" tends to create a stiffer pivoting motion due to the frictional coefficient between these two materials. A lower friction surface consists of a low friction polymer and rubber O-ring with a polymer coating on the O-ring such as Teflon.

The manufacture of the component parts that make up the prior art design include the difficult machining of two separate precision bushings both having the same radius intended to mate perfectly to a metal ball. This is complicated by the fact the bushings are separated by a non-precision rubber O-ring in the assembly In the '869 patented invention, significant manufacturing difficulty can be expected when one attempts to mate two Teflon bushings with mirrored radii separated by an imprecisely molded O-ring in a liner assembly. Then by subjecting the part it to any amount of light assembly pressure, this assembly will change the shape and frictional characteristics of the entire assembly. Micro finishes and extra care must be employed to have the correct mirror finish or polish on the metal ball. If not, more friction will occur. This friction causes the desired swivel action to become restrictive during use requiring more effort for the diver to properly position the second stage during the dive. Because the second stage is held in the diver's mouth by means of a silicone rubber mouthpiece firmly controlled with the diver's clenched teeth and neck muscles as the diver looks from side to side to view the underwater experience, any restriction can cause discomfort.

This prior art is subject to binding, "not enough clearance" or open gaps, "too much clearance". Therefore very high machining tolerances are needed to prevent the problems in the assembled position.

If tolerances are too loose and the low friction bushings have extra clearance and the wiping action of the outer seawater side bushing allows sand silt salt or debris to enter between this outside bushing and metal ball, the debris collects and becomes impacted into the malleable Teflon plastic.

This impacted debris may contain abrasive material such as sand and this creates friction. Debris rubs and scratches into the metal ball over time creating air leak paths between the O-ring and metal ball.

What is needed is a ball swivel second stage that has a lower frictional contact load when pressurized and provides the diver with a smooth trouble free low friction swivel and with easier and less costly manufacturing.

The low friction swivel design second stage hose assembly of the present invention uses a ball with O-ring groove or slot, machined into the ball and a solid one-piece low friction bushing machined to fit the diameter of the metal ball. It eliminates friction, makes for easier manufacturing and tends to self clean the bushing by using the O-ring to not only seal the assembly, but to also keep debris from fouling the bushing contact area by forcing debris out of the contact area during normal usage.

The manufacturing aspect of making a one-piece plastic socket bushing not only creates a lower friction area for the O-ring to rotate and axially pivot, but also allows the one-piece bushing to be made with one continuous radius during the machining operation.

If two separated bushings are mated together, the space between them is eliminated by removing the O-ring and allowing one to better engage the metal ball and properly mate to the circularity of the desired ball diameter. The measure of friction is the difference between metal and rubber vs. rubber and low friction plastic such as Teflon Delrin LF or UHMWPE. The smooth lower friction socket engages the metal ball with a slight contact rubber O-ring smoothly contained in a lower friction cavity.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which.

DETAILED DESCRIPTION OF A PREFERRED EMBODIMENT

Figure 1:
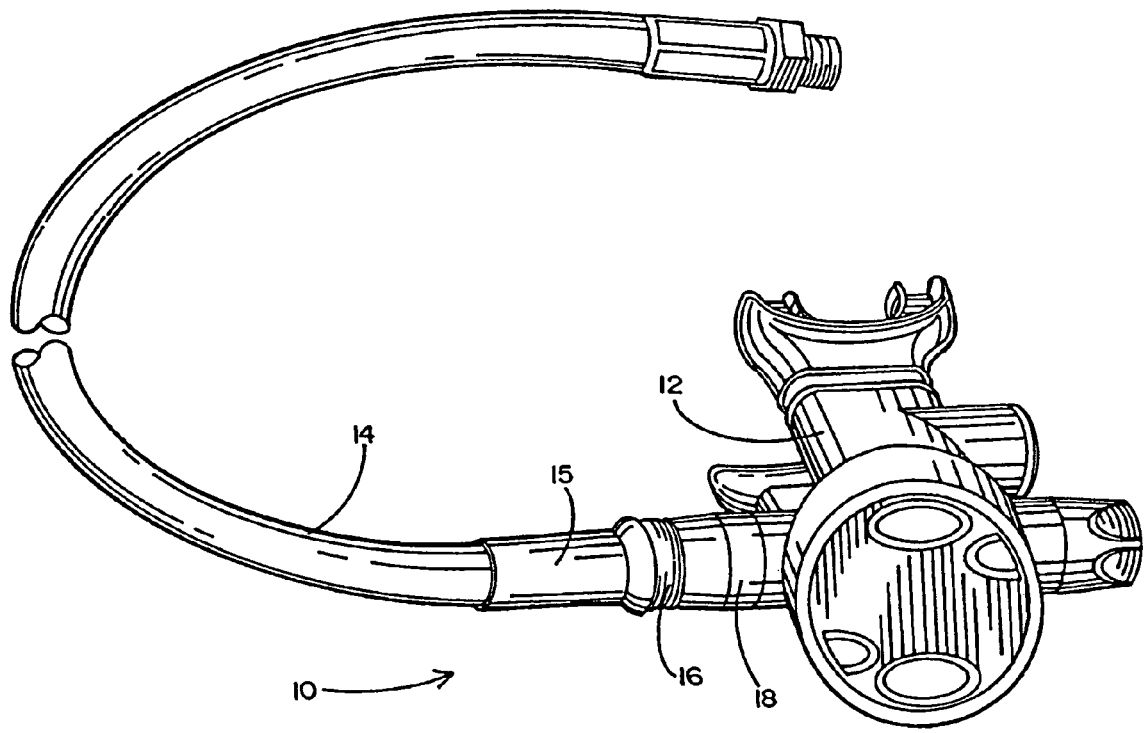
FIG. 1 is a three-dimensional drawing of a second stage scuba diving regulator and associate air hose connected to the regulator with a swivel connector according to a preferred embodiment of the invention.
Figure 2:
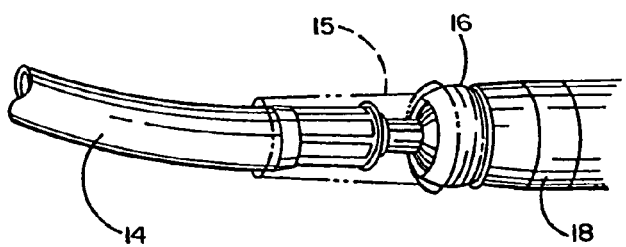
FIG. 2 is a view of the swivel connector of FIG. 1 with a protective boot in phantom to reveal the ball and socket arrangement of the connector; and of FIG. 1.
Figure 3:
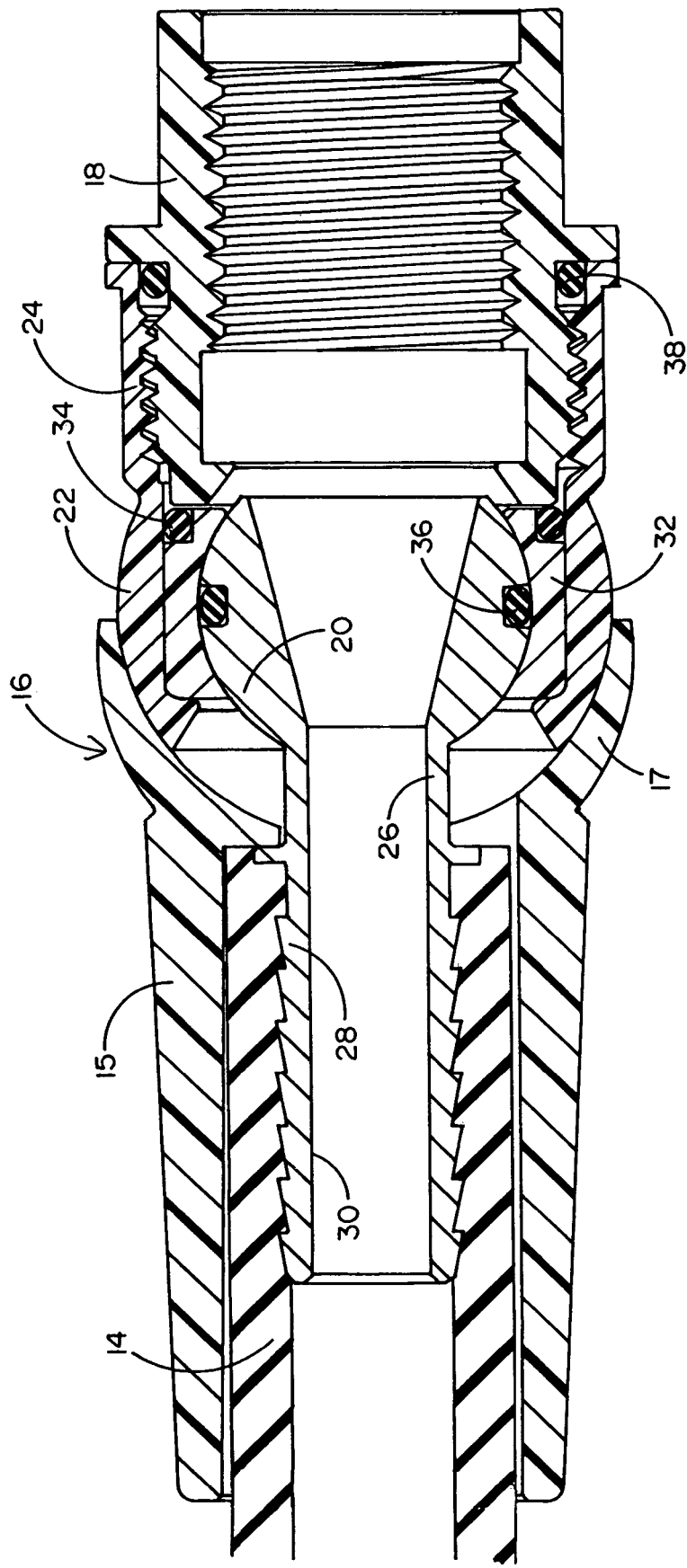
FIG. 3 is an enlarged cross-sectional view of the swivel connector of FIG. 1.

Referring to the accompanying drawings, it will be seen that the present invention is employed in conjunction with a second stage regulator assembly 10 comprising a regulator 12 and an air hose. 14. The preferred embodiment of a swivel connector 16 of the present invention is disposed between the regulator 12 and hose 14 as shown in FIG. 1. A wiper ring boot 15 is disposed over the hose 14 adjacent the swivel connector 16 in a manner which aids in the reduction of contamination of the swivel connector as will be explained in detail hereinafter. The swivel connector is secured to the regulator 12 using an interface connector 18. An O-ring 38 provides a watertight seal with connector 18. The manner in which the swivel connector 16 is secured to hose 14 is understood best from FIG. 3. As seen in FIG. 3, swivel connector 16 comprises a swivel ball 20 secured in a swivel socket 22, which terminates in connector 24, the latter being threadably secured to interface connector 18. Swivel ball 20 has an integral elongated stem 26 which terminates in an anchor portion 28 within hose 14. Stem 26 and anchor portion 28 form an interior air passage 30 which extends into the air passage within hose 14. As also seen best in FIG. 3, boot 15 terminates in a bell-shaped wiper portion 17 which engages socket 22 to wipe away sand and other particulate contaminants from the socket surface as the swivel is rotated during use. O-ring 34 prevents seawater from entering passage 30.

The ball 20 is secured within socket 22 using a one-piece bushing 32. Ball 20 is uniquely provided with an O-ring 36 that is installed in a slot or channel in the ball itself at the center tangent point with one-piece bushing 32. As the swivel connector 16 is rotated, the O-ring 36 wipes the adjacent congruent surface of bushing 32. The bushing is preferably made of a low friction material such as a polymer or the like. A lubricant is preferably placed between the O-ring 36 and the bushing 32 to further facilitate smooth swivel motion. The bushing 32 is machined or molded with the same radius as the swivel ball 20.

Having thus disclosed a preferred embodiment of the invention, it will now be evident that various modifications and additions may be readily perceived. By way of example, the specific materials recited herein are by way of illustration only and may be readily substituted by other equally appropriate materials. Accordingly, the scope hereof is to be limited only by the appended claims and their equivalents.

I claim:

1. An assembly connecting a scuba second stage regulator to an air pressure hose; the assembly comprising:
   a ball and socket, the ball having a hollow stem connected to the hose, the socket having a threaded connector attached to the regulator;
   a bushing surrounding the ball within the socket, the bushing having a substantially congruent surface engaging the exterior surface of the ball in sealing engagement;
   the ball having a channel along its exterior surface engaged by the bushing and an O-ring in the channel to sealingly wipe the bushing during swiveling of the socket.

2. The assembly recited in claim 1 wherein said bushing is made of a polymer.

3. An assembly interconnecting a scuba second stage regulator and an air pressure hose; the assembly comprising:
   a ball and socket configured for permitting pressurized air to flow from said air hose to said regulator;
   a bushing located between said ball and said socket, said bushing having a ball engaging surface that is substantially congruent to the exterior surface of the ball;
   the ball having a channel along its exterior surface engaged by the bushing and an O-ring in the channel to sealingly wipe said bushing's ball engaging surface during swiveling of the ball and socket.

4. The assembly recited in claim 3 wherein said bushing is made of a polymer.

* * * * *